United States Patent [19]

Hennessey et al.

[11] Patent Number: 4,526,255
[45] Date of Patent: Jul. 2, 1985

[54] FLUID DRIVE TRANSMISSION EMPLOYING LOCKUP CLUTCH

[75] Inventors: Richard G. Hennessey, Oak Lawn; Richard B. Beemer, Lombard; Harold W. Melles, Downers Grove, all of Ill.

[73] Assignee: J. I. Case Company, Racine, Wis.

[21] Appl. No.: 423,893

[22] Filed: Sep. 27, 1982

Related U.S. Application Data

[63] Continuation-in-part of Ser. No. 240,040, Mar. 3, 1981, Pat. No. 4,388,987.

[51] Int. Cl.³ ............................................. B60K 41/22
[52] U.S. Cl. ................................. 192/3.58; 192/3.62; 192/0.092; 192/3.31; 192/103 R; 74/732
[58] Field of Search ............... 192/3.61, 3.28, 3.29, 192/103 R, 3.31, 3.32, 3.33, 3.57, 3.58, 87.18, 87.14, 87.12, 0.092, 3.62; 74/745, 731, 732, 645; 364/424.1

[56] References Cited

U.S. PATENT DOCUMENTS

| | | | |
|---|---|---|---|
| 2,970,482 | 2/1961 | Strehlow et al. | 74/745 X |
| 3,390,594 | 7/1968 | Gillespie | 192/3.31 |
| 3,442,346 | 5/1969 | Winter et al. | 74/745 |
| 3,783,985 | 1/1974 | May | 74/745 |
| 3,805,640 | 4/1974 | Schneider et al. | 74/733 |
| 3,861,241 | 1/1975 | Hancock | 74/733 |
| 3,944,035 | 3/1976 | McRay | 192/3.57 |
| 4,027,554 | 6/1977 | Ito et al. | 192/3.58 X |
| 4,373,619 | 2/1983 | Schritt et al. | 192/3.28 X |

FOREIGN PATENT DOCUMENTS

2033032  5/1980  United Kingdom .

Primary Examiner—George H. Krizmanich
Attorney, Agent, or Firm—Dressler, Goldsmith, Shore, Sutker & Milnamow, Ltd.

[57] ABSTRACT

A transmission system particularly useable for transmitting power from an internal combustion engine to the driving wheels of a vehicle such as a tractor. The system includes a multiple ratio mechanical range transmission coupled to a speed transmission via a manually operable master clutch. A high slip fluid coupling is used to couple the speed transmission to the engine, and an electronically controlled lockup clutch locks the impeller of the fluid coupling to the output turbine of same when the speed of the engine exceeds a first predetermined speed, and maintains the coupling locked until the speed of the engine drops below a second substantially lower predetermined speed; the difference between the predetermined speeds is due to a speed comparator hysteresis which serves to prevent hunting during automatic gear shifts between different ratios.

18 Claims, 5 Drawing Figures

FLUID DRIVE TRANSMISSION EMPLOYING LOCKUP CLUTCH

This case is a continuation-in-part to our co-assigned U.S. application Ser. No. 240,040 filed Mar. 3, 1981 now U.S. Pat. No. 4,388,987. A closely related companion application contemporaneous to both is co-assigned U.S. application Ser. No. 379,549 filed May 18, 1982.

BACKGROUND OF THE INVENTION

1. Field of the Invention

This invention relates generally to rotary power transmission systems, and more particularly to fluid drive transmissions utilizing a fluid coupling and a lockout clutch to lock the impeller and output turbine of the fluid coupling together under predetermined operating conditions. Even more particularly, the present invention relates to the use of such a fluid coupling and lockout clutch in combination with a speed transmission usable for high torque applications such as those encountered in transmitting power from the engine to the driving wheels of a tractor.

2. Description of the Prior Art

Speed transmissions are well known and have been used for some time in tractor applications, with a typical speed transmission of the hydromechanical type being described in U.S. Pat. No. 4,138,907, which is assigned to the same assignee as the present invention. In addition, the use of fluid drive lockup clutches is also known, particularly in conjunction with torque converters of automobile transmissions and the like, as described in U.S. Pat. Nos. 3,693,478, 3,809,956; 3,861,241; 4,033,202; 4,056,177; and 4,152,984. However, no attempt has been made to utilize a lockup clutch in a fluid coupling, particularly in a fluid coupling and speed box utilized as a transmission to apply power from an engine to the driving wheels of a tractor.

Background patents further include but are not limited to Pat. Nos. 3,390,594; 3,949,847; 4,056,177; and especially 4,131,184 and 4,208,929.

In a typical tractor transmission, such as for example, the one described in the aforesaid U.S. Pat. No. 4,138,907, the engine is disclosed coupled to a hydromechanical transmission which is, in turn, coupled to a variable ratio machanical transmission via a master clutch. The output of the variable range mechanical transmission drives the driving wheels of the tractor, and the hydromechanical transmission is generally coupled directly to the flywheel of the engine, but in some instances a fluid drive may be used to couple the engine to the hydromechanical transmission.

While such systems have been used successfully in tractors and other vehicles, tractors employing a transmission that is directly coupled to the engine are difficult to control at low speed, and require that the master clutch be slipped when the tractor is moved slowly. Such clutch slipping results in wear and deterioration of the master clutch, and also in a bucking of the tractor. This bucking is not only unpleasant to the operator, but can be quite dangerous in many situations. For example, when a tractor is being hitched to a farm implement or trailer, an unfortunate buck of the tractor might give a discomfitting jolt to a person holding the hitch of the tractor in alignment with the hitch of the implement.

In an attempt to improve the controllability of tractors and the like at low speed, some manufacturers have utilized a fluid coupling between the engine and transmission, because a fluid coupling has a certain amount of slip which reduces the tendency of a tractor to buck and improves low speed control. However, permitting such fluid slip is detrimental in that it reduces the fuel efficiency of the tractor; thus, the design of the fluid coupling requires a trade-off between low speed operation and fuel efficiency, with greater slip favoring low speed operation at the expense of fuel efficiency and vice versa. Known teachings in the art lead away from our unique locking coupling in fact, because we recognize, as a decided departure form prior art, utility in an inordinately high-slipping fluid coupling and we realize, as a decided departure from the art, that particular utility by our novel design achieving the high slip.

SUMMARY OF THE INVENTION

Accordingly, it is an object of the present invention to provide a power transmission system that overcomes many of the disadvantages of the prior art power transmission systems.

It is another object of the present invention to provide a rotary power transmission that provides efficient power transfer while retaining good controllability over a wide range of engine and vehicle speeds.

It is yet another object of the present invention to provide a rotary power transmission system that is particularly suitable for low speed, high torque applications, such as tractor applications.

It is yet another object of the present invention to provide a multiple range transmission that employs a fluid coupling and lockup clutch to achieve good low speed control while maintaining high efficiency.

It is another object of the present invention to provide a high efficiency speed transmission employing a fluid coupling having an electronically controlled lockup clutch particularly suitable for tractor applications.

In accordance with various preferred embodiments of the invention hereinafter disclosed, there is provided a composite or tandem transmission system having a variable ratio mechanical range transmission coupled to a speed transmission by means of a manually operable master clutch. The speed transmission is coupled to the engine by means of a fluid coupling, and an electronically controlled lockup clutch is used to lock the impeller of the fluid coupling to the output turbine under certain operating conditions of the vehicle. The electronic control circuit used to control the operation of the lockup clutch is responsive to engine speed, and maintains the impeller and the output turbine of the fluid coupling in an unlocked condition when the speed of the engine is below a first predetermined level to provide precise low speed handling of the vehicle. As the speed of the engine rises above the aforesaid first predetermined level, the electronic circuit serves to actuate the lockup clutch at a controlled engagement rate to lock the impeller and turbine of the fluid coupling together to provide efficient power transfer under normal operating conditions. The electronic circuit then maintains the impeller and output turbine in a locked condition until the speed of the engine drops below a second predetermined level that is selected to be below the first predetermined level by a substantial amount in order to maintain efficient power transfer even at lower speed, high load conditions. Should the speed of the engine drop below that second, lower predetermined level, the system will serve to unlock the lockup clutch to avoid stalling the engine and to permit smooth reacceleration. Also, the use of a lockup clutch avoids the tradeoff between efficiency and low speed control, and permits the use of a higher slip fluid coupling than could previously be used, thereby further enhancing low speed control characteristics without sacrificing power transfer efficiency.

More particularly in that preferred embodiment hereof which employs as its speed transmission a hydromechanical transmission affording infinitely variable speed within a limited range for each fixed gear reduction ratio, an object is to provide an unvarying series engagement action among the master clutch and fluid drive lockup clutch. That is to say, the lockup and master clutches, occurring physically in that specific order in series in the transmission power path, follow the rigid sequence whereby the first-to-engage master clutch only prepares the power path each time for completion, and then the last-to-engage lockup clutch in that series always completes the power path for full drive.

Whereas, in that preferred embodiment hereof which employs as its speed transmission a selectable HI-LO power shift clutch transmission, an object is to provide a likewise unvarying series engagement action among the selected power shift HI-LO, master, and fluid drive lockup clutches. That is to say, the lockup and selected HI-LO and master clutches, occurring physically in that specific order in series in the transmission power path, follow the rigid sequence whereby the selected HI-LO clutch first prepares its portion by first engagement readying the power path for completion, the next-to-engage master clutch prepares its portion by then next engaging to further ready the power path for completion, whereupon the last-to-engage lockup clutch in that series always completes the power path for full drive.

Or, considered independently of the pedal-operated master clutch, ground speeds varying from standstill to considerable speeds can be readily and smoothly accommodated with all variance being afforded by high-slip fluid coupling drive. Moreover thereafter, the unlock-to-lock sequence of the thus high slipping drive affords its power upshift, the overlapping clutch LO-to-HI sequence of the power shift clutches affords its power upshift and the two sequences simultaneously afford the combined, larger power upshift, for a welcome assortment of driver's on-the-go shifting selections altogether free from pedal clutching.

DESCRIPTION OF THE DRAWING

These and other objects and advantages of the present invention will become readily apparent upon consideration of the detailed description and attached drawings, wherein.

DETAILED DESCRIPTION OF A PREFERRED EMBODIMENT

Figure 1:
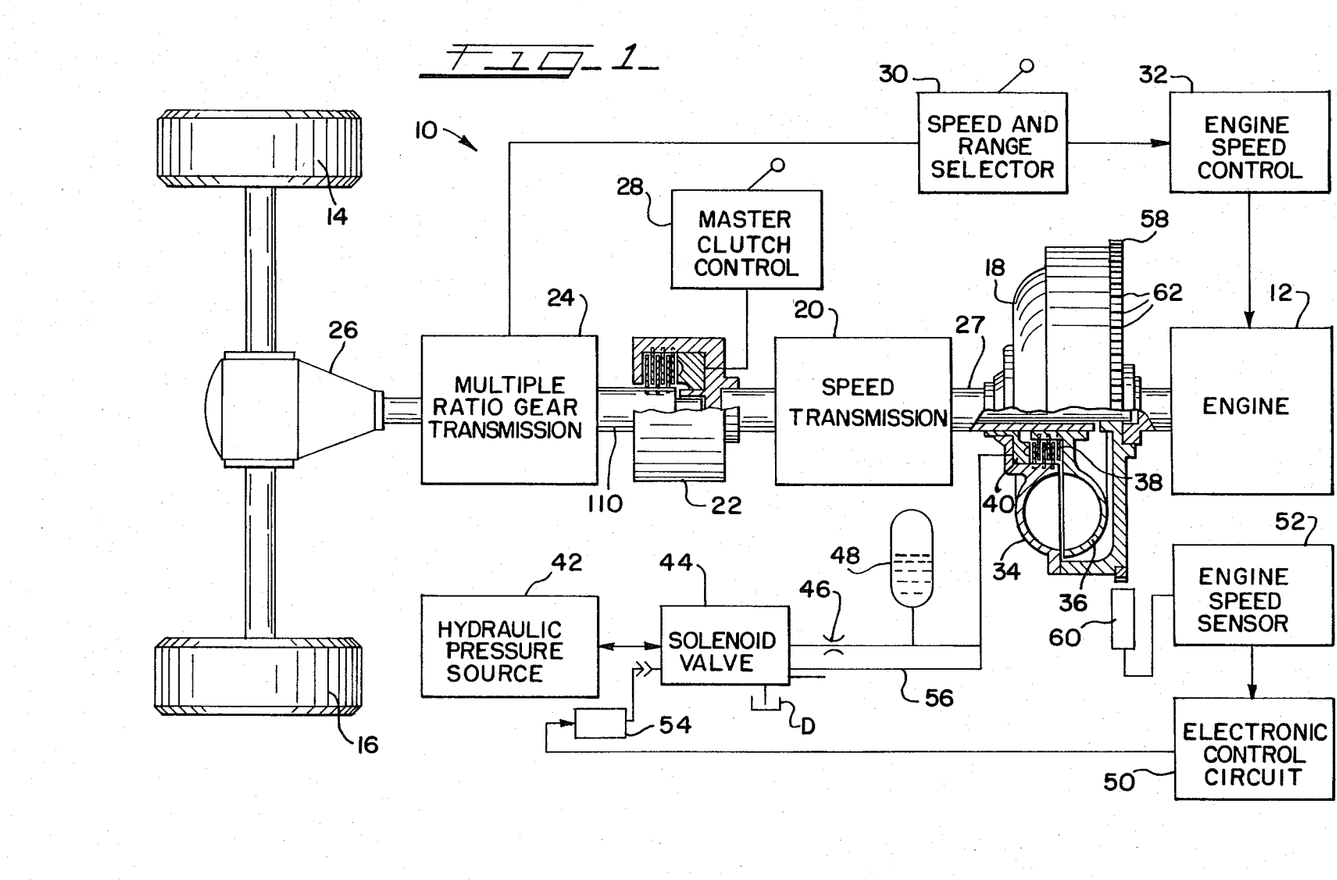
FIG. 1 is a block diagram of a transmission system embodying the principles according to our invention.

Referring now to FIG. 1, there is shown a block diagram of the transmission system according to the present invention, generally designated by the reference numeral 10. The system illustrated in FIG. 1 transfers power produced by an engine 12 to a set of driving wheels 14 and 16 via a fluid coupling 18, a speed transmission 20 having an imput shaft 27 connected to the coupling, a master clutch 22, a second transmission 24, which in a preferred embodiment is a multiple ratio gear transmission, and a differential 26. A master clutch control 28 which may be a hydraulic or other clutch control permits manual engagement and disengagement of the master clutch 22, which in the illustrated embodiment, is shown interposed between the speed transmission 20 and the shiftable, step ratio transmission gear box 24; however, since the purpose of the master clutch 22 is selectively to interrupt the flow of power between the engine 12 and the wheels 14 and 16, the master clutch may be placed at any convenient point between the engine 12 and the differential 26. A speed and range selector 30, which may be a hand movable lever, a pedal, or a combination of the two is used to select the desired range in the multiple ratio gear transmission and to control the speed of the engine 12, preferably by means of an engine speed control 32, which may be a governor or the like.

In accordance with an important aspect of the present invention, the fluid coupling 18 contains an impeller or pump 34 and an output turbine 36 selectively locked together by a lockup clutch 38. The lockup clutch 38 is engaged and disengaged by a clutch actuator 40, which is preferably a hydraulic clutch piston activated by a hydraulic pressure source 42 under the control of a solenoid valve 44. A flow restrictor 46, operating in conjunction with an accumulator 48, introduces a slowed action, causing the clutch actuator 40 to engage the lockup clutch 38 at a gradual, controlled rate. The solenoid valve 44 is controlled by an electronic control circuit 50 which is responsive to engine speed as represented by an engine speed signal provided by an engine speed sensor 52. A power take off (not shown) may also be provided to drive auxiliary equipment; however, such a power take off would normally be coupled to the engine 12 ahead of the fluid coupling 18, and thus not be affected by the operation of the fluid coupling 18 or the lockup clutch 38.

Although the above-described system is applicable to many systems that require rotary power to be efficiently transmitted from one point to another, the system according to the invention is particularly suitable for tractor applications. Thus, the system will be described in a farm tractor environment, and its advantages will be particularly apparent.

In operation to drive the tractor, the master clutch control 28, such as a pedal or the like, is used to disengage the master clutch 22 in order to interrupt the power transmission path between the engine 12 and the driving wheels 14 and 16. The speed and range selector 30 is used to select the desired range in the multiple ratio gear transmission 24 and to control engine speed. The master clutch 22 is then engaged to permit power to be transferred between the engine 12 and the wheels 14 and 16, thus permitting the tractor to move.

As the tractor begins to move, the lockup clutch 38 is maintained in a disengaged position, thereby permitting slip between the impeller 34 and the driven turbine 36 of the fluid coupling 18. This permits the tractor to be started smoothly and permits the speed of the tractor to be easily and accurately controlled. Because of the nature of a fluid coupling, which can transmit only a limited amount of torque at low speed, the operator can easily control the speed of the tractor simply by utilizing the brake pedal (not shown) to retard the movement of the wheels 14 and 16.

Once the tractor is moving, and the speed of the engine is increased, the amount of torque transmitted by the fluid coupling increases, thereby permitting the tractor to be brought up quickly to speed but smoothly. However, once operating speed is reached, it is undesirable to permit relative motion between the impeller 34 and turbine 36 of the fluid coupling 18, since such relative motion wastes energy which must be dissipated as heat by the fluid coupling 18, and also results in an increase in fuel consumption by the engine 12.

Accordingly, the engine speed sensor 52 is used to provide an electrical signal representative of the speed of the engine 12. This engine speed signal is monitored by the electronic control circuit 50 which causes the lockup clutch 38 to lock the impeller 34 and the turbine 36 together to eliminate the energy loss resulting from slip in the fluid coupling 18 once operating speed has been reached. Although the lockup clutch 38 may be engaged and disengaged in a variety of ways, in the present preferred embodiment illustrated the clutch 38 is engaged and disengaged hydraulically under the control of the electronic control circuit 50. In this illustrated embodiment, the electronic control circuit 50 opens and closes the solenoid valve 44 which, when open, permits hydraulic pressure from the hydraulic pressure source 42 to flow to the clutch actuator or hydraulic piston 40, through the flow restrictor 46. The flow restrictor 46 operates in conjunction with the accumulator 48 to permit pressure to build up gradually, as determined by the size of the flow restrictor 46 and the volume of accumulator 48, to thereby slow the lockup clutch 38 to a gradual engagement.

Once the lockup clutch 38 engages, it is desirable to maintain the clutch engaged if the speed of the engine 12 should drop below the speed at which the clutch 38 was originally engaged. This is desirable for two reasons. Firstly, it reduces the number of times that the clutch 38 must be engaged and disengaged as the speed of the engine 12 varies about the engagement point, and thus reduces wear of the clutch 38. Secondly, because of the nature of operation of a vehicle such as a tractor, the speed of the engine 12 may slow down when a higher load is placed on the tractor. Under such conditions, it is desirable to maintain the impeller 34 and the turbine 36 locked to provide maximum transfer of torque through the system. Thus, once the lockup clutch 38 has been engaged, it is maintained engaged until the speed of the engine 12 drops substantially below the speed at which the clutch 38 was originally engaged. Typically, for tractor operations, the lockup clutch 38 is originally engaged once the speed of the engine 12 exceeds a higher transition speed of approximately 1400 rpm, and disengaged when the speed of the engine 12 drops below a lower transition speed of approximately 1000 rpm; however, these transition speeds will vary depending on the particular engine and vehicle used, and the intended applications of that vehicle.

Electric control of the operation of the solenoid valve 44 for fluid drive clutch lockup and disengagement is important. The electronic control circuit 50 electrically controls the operation through an interconnecting drive circuit 54 for activating the solenoid valve 44.

The deliberately designed-in, unique high-slip drive condition afforded by our invention, considered in contrast to the subsequent lockup condition established by the open solenoid valve 44, means that the driver experiences a driver-clutchless power upshift operation, in effect adding a new dimension to transmission operation in general and to automatic transmission operation in particular; in other words, the substantial difference in ground speed under the two conditions produces as manifest speed-up as an actual shift in gears.

Once the speed of the engine 12 drops below the lower transition speed, the electronic control circuit 50 monitors the reduction in engine speed and causes the solenoid valve 44 to close, thus blocking hydraulic pressure of the hydraulic pressure source 42 from the clutch actuator 40. Simultaneously, the solenoid valve 44 will in one path permit hydraulic fluid to flow from the accumulator 48 to a reservoir D through the flow restrictor 46, and full flow in a direct path 56 from the emptying clutch 38 to the drain D. This will result in relieved pressure on the clutch actuator piston 40 and a rapid disengagement of the lockup clutch 38.

For roading operations the range transmission selector 30 is placed in high range and the hand throttle is set at idle. The tractor speed is controlled by an accelerator pedal, not shown, which sequentially controls both engine speed and speed transmission ratios. Pushing down and letting up on the pedal will sequence the controls without the use of the hand throttle. This will enable the tractor to be driven on the road functioning like an automatic transmission vehicle. Starting and stopping when on the road is accomplished through the use of the accelerator pedal and brakes, and the clutch pedal is not needed during this time.

In a decelerating mode on the road the operating sequence will be reversed; that is, as the accelerator pedal is released the ratio of the speed transmission will deepen to a deeper reduction while the engine rpm stays generally at the initial rate due to engine braking as the mass of the vehicle drives the engine. The lockup clutch 38 will remain locked until the rpm eventually drops below the 1000 rpm providing sustained engine braking. After dropping below the lower disengagement speed the vehicle may be conveniently brought to a halt with only the service brakes and without stalling the engine.

When the range transmission control is in reverse, the lockup clutch 38 of the fluid coupling will be unengageable and the fluid coupling 18 will have the capability of slipping whenever the tractor vehicle is in reverse. This is especially desirable when hitching up implements behind the tractor, such as when connecting a disk harrow to the tractor drawbar. The tractor will be in reverse and the fluid coupling will be utilized but with no lockup. This can be accomplished by an electrical contact in the reverse position of the transition control gate. Thus, even if the engine rpm exceeds the lockup transition speed, the lockup clutch of the fluid coupling will not be engaged.

Because the fluid coupling 18 is locked when the tractor is operating at normal operating speed, and thus does not introduce any inefficiencies into the system under this condition, the compromise between operating efficiency and low speed controllability is avoided. Consequently, a fluid coupling having an inordinately large amount of slip, for example, on the order of at least approximately 10 percent, at rated load and speed (e.g., 2,400 rpm), is necessarily employed to enhance low speed controllability without degrading operating efficiency. This is a contrast in kind to a system without a lockup clutch in which the slip typically cannot exceed 3 percent without excessively degrading efficiency.

Recognizing the utility of what might be termed a grossly inefficient fluid coupling, we have been unable to find anything analogous on the market. Torque converters, the distinctive alternate, fall critically short of the coupling's unique parabolic performance curve (torque proportional to square of engine speed). Finally, we have realized the utility sought by crucial redistributing and reducing of the number of vanes in the regular efficient coupling. So the lockup unclutching and clutching of our unique fluid coupling 18 affords two substantially different speed ratio modes which are very noticeable to the operator in driving the speed transmission input shaft 27 without and with the fluid drive lockup.

The engine speed sensor 52 is connected to the tractor engine 12 by way of the flywheel 58 of the latter and an associated transducer presented by the sensor 52. The transducer comprises a pickup 60 which may be a variable reluctance magnetic pickup, an optical pickup, or any other pickup that provides a pulsed signal proportional to engine speed. In the present embodiment, the pickup 60 is a variable reluctance magnetic pickup which is placed in close proximity to the flywheel 58 of the engine 12, or to another rotating member that rotates at a speed proportional to the speed of the engine 12. The flywheel 58 has a plurality of gear teeth 62, and thus, as the flywheel 58 rotates, the magnetic field within the magnetic pickup 60 is altered as each tooth 62 is brought into and out of proximity with the magnetic pickup 60. This altering of the magnetic field within the pickup 60 causes pulses to appear in the output leads of the pickup each time a tooth of the flywheel passes the magnetic pickup 60, and these pulses make up the output signal from the magnetic pickup 60 to the engine speed sensor 52. A frequency-to-voltage conversion is made responsive to the signal from the magnetic pickup 60 and provides a voltage whose magnitude is proportional to the frequency of the pulses produced by the magnetic pickup 60, and consequently to the speed of the engine 12.

Various known circuits can be employed to provide a voltage that varies as a function of input frequency, such as microprocessor or other integrated or discrete circuits.

In the illustrated embodiment of FIG. 1, the preferred electronic control circuit 50 is the logic circuit which is disclosed and claimed in said co-assigned Ser. No. 240,040 of ours and which is found satisfactory, at the speeds stated, to declutch or else to clutch and lock out the fluid drive from its normal high-slip drive operation.

Further in that illustrated embodiment, the speed transmission 20 has the hydromechanical design which is disclosed and claimed in said co-assigned U.S. Pat. No. 4,388,987 and which, for each fixed speed reduction ratio as selected by the step-ratio engaged gearing in the speed transmission, affords hydromechanically provided infinitely variable speed characteristics within a limited range while fixed at that ratio.

Our transmission system is additionally well adapted to a power-shifted speed transmission arrangement, as will now be explained.

Figure 2:
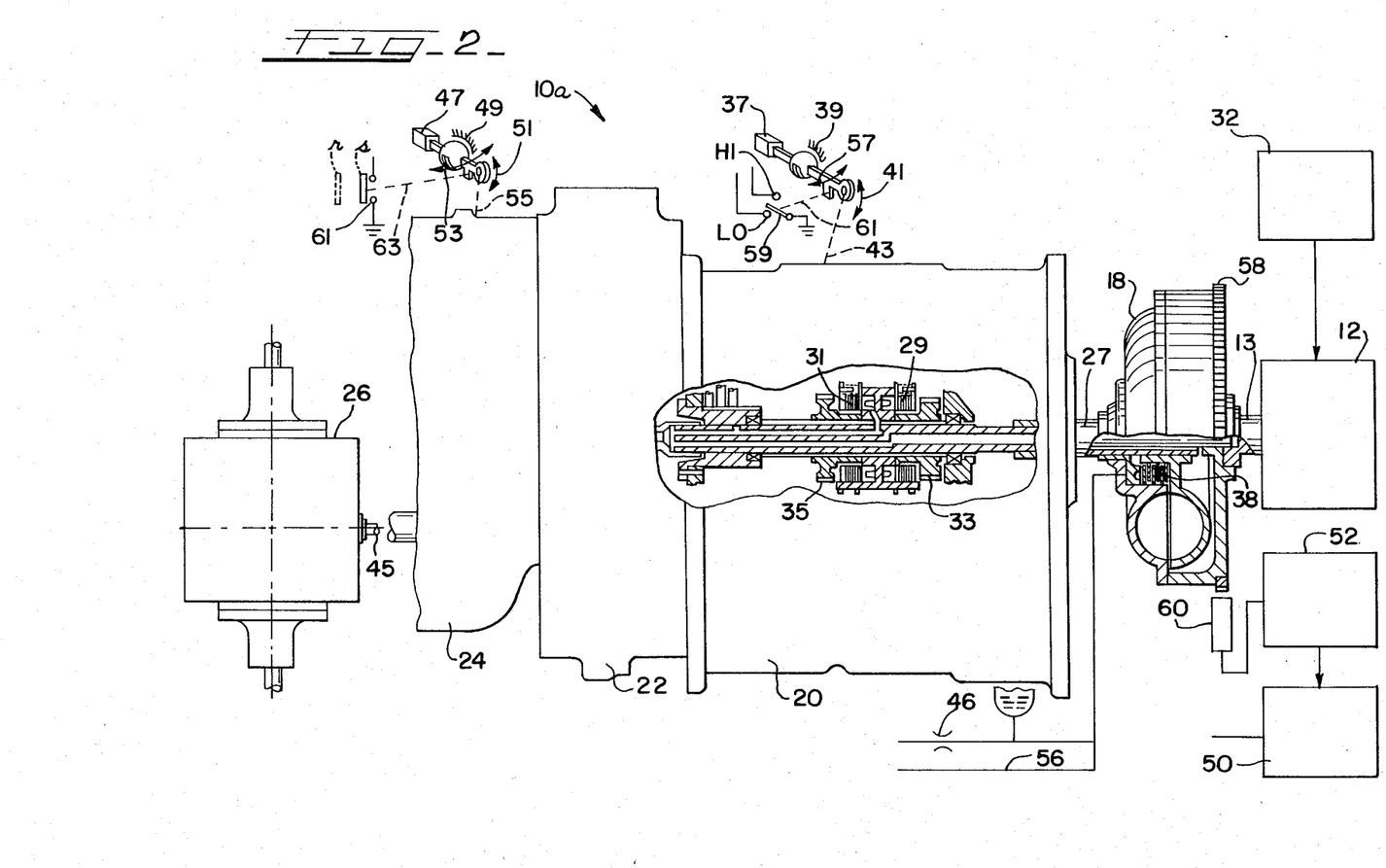
FIG. 2 is a view, partially in plan, partially in elevation, and partially in cross section, of a four clutch composite transmission power train including a power-shift speed transmission but without the hydraulics, and monitored and controlled according to a second embodiment of the present invention.

HI-LO POWER SHIFT—FIG. 2

Illustrative of that power shift speed transmission adaptation is the embodiment of our invention appearing at 10a in this figure.

More particularly, the engine has a crankshaft 13 which is provided with a fluid drive connection via the coupling 18 to the shaft 27 at the input end of the speed transmission 20. Respective low 29 and high 31 power shift clutch packs selectively connect the input shaft to a low speed drive gear 33 for torque amplification in the speed transmission or to a high speed drive gear 35. The difference in the speeds accorded thereby at the front end of the speed transmission 20 in the physically constructed embodiment of the invention illustrated was 17 percent depending upon which of the clutches 29 or 31 was selected.

A speed transmission handle 37 supported on a universal fulcrum 39, when tilted by the tractor operator in motion as indicated by the double headed arrow 41, acts through a mechanical transmission connection 43 to select three separate gear ratios alternatively driven by the low speed or high speed gears 33 and 35. So the parallel power path portions selectively provided by the low 29 and high 31 clutches enable the speed transmission 20 to yield six speeds, three changes of which are made by power shift.

Interposed in a common path at the power output end of the speed transmission 20 is the manual master clutch 22 effectively in series with the intervening gear ratio trains, not shown, and with either power shift clutch 29 or 31.

The master clutch 22 at the end of the speed transmission 20 connects it to the range transmission 24 of the gear-box type generally as shown in co-assigned Pat. No. 4,138,907. A propeller shaft 45 in turn connects the range transmission 24 to the rear wheel differential 26 at the rear of the tractor.

A range handle 47 has a fulcrum as is standard and as is simply represented by a schematic ball joint 49 so as to have the tilt movement as indicated by a double headed arrow 51 and lateral movement indicated by a arrow 53 as necessary in a quadrant of familiar H-shape.

A mechanical connection 55 between the handle 47 and range transmission 24 enables the transmission to accommodate to the five handle settings neutral, reverse, high, low and medium range.

The foregoing three forward ranges of the range box 24 enable the six speed transmission 20 in cooperation therewith to provide eighteen speeds forward to the differential 26, broken down into nine pairs in which the two speeds of each pair can be power shifted back and forth between the high one and the other or torque amplifying one. The gearing of both transmissions 20,24 have mechanical synchronizers of the same general type as described hereinafter in the illustrative example disclosed in connection with a power-shift speed transmission 20.

The standard support indicated schematically as a universal fulcrum 39 for the speed handle 37 affords similar lateral movement to the speed handle in the direction of the double headed arrow 57. A speed handle switch 59 is operated by the speed handle 37 through a mechanical connection 61 to provide a selection as between a contact HI to electrohydraulically operate the high clutch 31 and a contact LO to power shift on the go and operate the low clutch 29 for torque amplification. Similarly, the high clutch 31 power shifts on the go.

A range handle switch 61 is operated by the range handle 47 through a mechanical connection 63. The switch 61 takes an open position r corresponding to the range transmission being placed in reverse setting and a position s which is closed corresponding to the transmission being shifted out of the reverse setting.

The electrical hydraulic control for the four clutch system engages and disengages the clutches hydraulically as will now be explained, or as appropriately reviewed, in the description of FIG. 3.

Figures 3, 4:
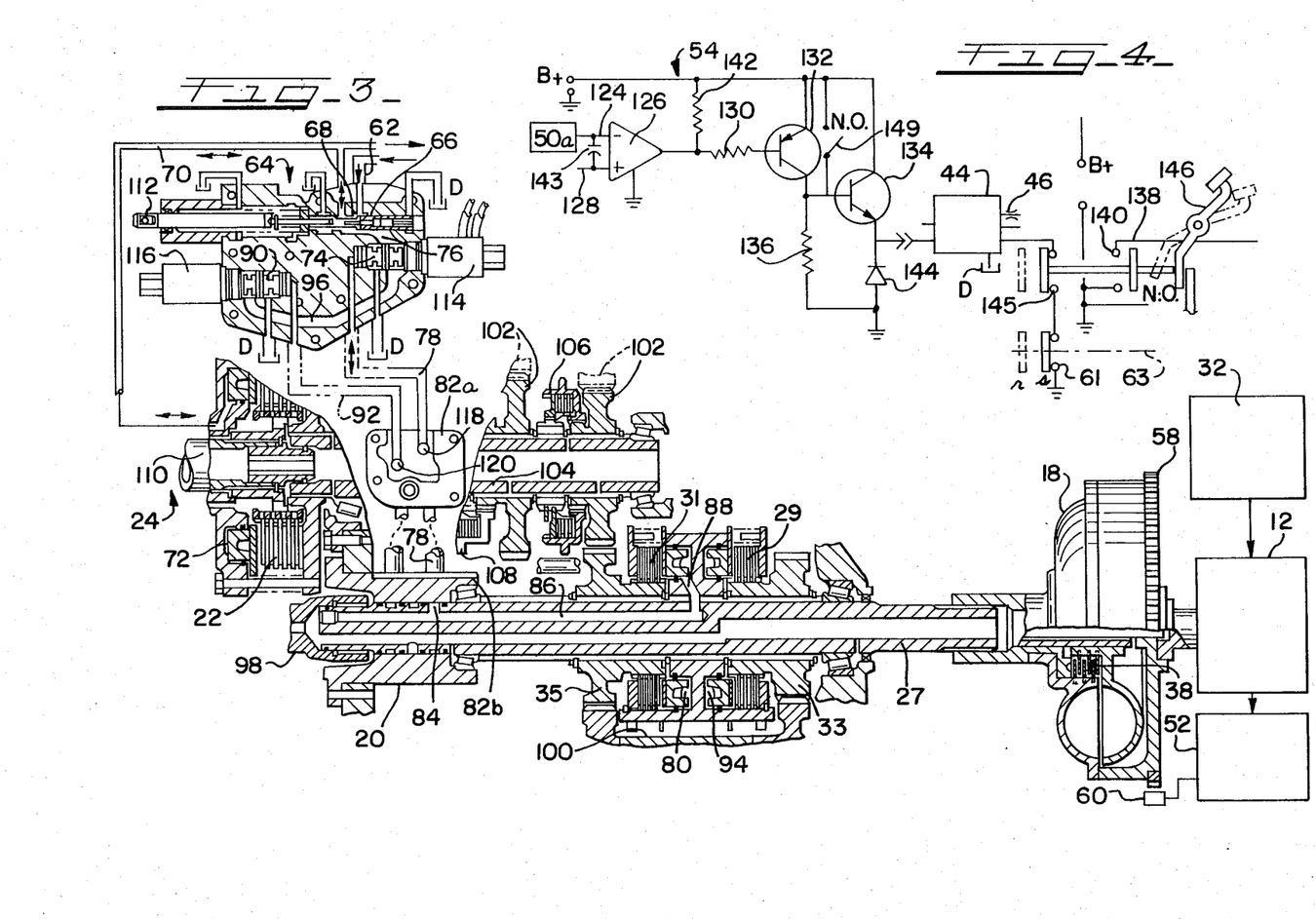
FIG. 3 is a view, similarly, of the power-shift speed transmission to an enlarged scale and including the hydraulics.
FIG. 4 is a partial schematic showing of the driver circuit for one of the four clutches.

ELECTRICAL HYDRAULIC CONTROL HYDRAULICS—FIG. 3

A pressure fluid line 62 according to this figure supplies a common valve block 64 so as to hydraulically operate generally two and sometimes three (temporarily) clutches of the four clutch system. More particularly, a modulator master valve 66 applies, through a pressure fluid first branch 68, or relieves, through an adjacent drain D, hydraulic clutch pressure in a master clutch service line 70 leading into the clutch cylinder 72 for operating the master clutch 22.

An off-on HI valve 74 fully applies, through a pressure fluid second branch, or relieves, through an adjacent drain D, hydraulic pressure from a supply passage 76 to a high service line 78 leading in a path to the clutch cylinder 80 of the high clutch 31. More particularly, a manifold cover appearing in this figure in top plan 82a and in side elevation at 82b falls in the path leading from the high service line 78 and through radial passage 84 and a longitudinal passage 86 in the speed transmission input shaft 27, thence through a radial passage 88 into the high clutch cylinder 80 as mentioned.

Similar passages in the manifold cover 82a, 82b and input shaft 27 complete the complementary path from an off-on LO valve 90 through a low service line 92, the manifold cover, and the input shaft 27, thence into the clutch cylinder 94 for the low clutch 29. Like its counterpart HI valve 74, the off-on LO valve 90 either fully applies, through a pressure fluid second branch extension 96, or fully relieves, through an adjacent drain D, hydraulic pressure in the low clutch cylinder 94.

The change speed operation of the speed transmission 20 introduces a stepped assortment of power paths now to be explained.

SPEED TRANSMISSION POWER PATHS—FIG. 3

In this figure, preferably when it is driven at constant engine speed, the speed transmission input shaft 27 is used to provide a straight through drive to the shaft 98 of an independent power take off, not shown. And through appropriate mesh with complementary pinions on a countershaft 100 journalled in the speed transmission 20, the selected low speed and high speed drive gears 33 and 35 are able, through conventional intermediate gearing 102 on the countershaft 100 and the speed transmission output shaft 104, to in effect double the power paths which are available. For this purpose two blocker type synchronizer collars 106 and 108, shiftable by the speed handle, previously described, afford either a 1-2 speed, a 3-4 speed, or a 5-6 speed of the shaft 104, and the shift between the 1 and 2 speeds is by power from the clutches 29 and 31, the shift between 3 and 4 speeds similarly by power shift, and the shift between 5 and 6 speeds is similarly by power shift.

The master clutch 22 transmits, to the input shaft 110 of the range transmission 24, any one of the just mentioned six speeds of the speed transmission output shaft 104, and the rotation continues in the range transmission 24 through its high range, medium range, or low range paths, or through reverse.

The modulator master valve 66 has a pedal-operated protruding spool 112 accessible outside of the block 64 to provide the necessary precise manual modulation for the manual master clutch 22.

The HI valve 74 in valve block 64 is electromagnetically operated by a HI solenoid 114. The LO valve 90 is similarly electromagnetically operated by a LO solenoid 116.

Illustratively superimposed on the manifold cover in its top plane view 82a, are a pressure switch 118 in contact with and operated by hydraulic fluid in the high service line 78, and a similar pressure switch 120 in contact with and operated by hydraulic fluid in the low service line 92.

In FIG. 3, power shifting is important, for instance, shifting from the low clutch 29 affording seventeen percent more gear reduction and more torque, to the higher speed high clutch 31.

But in practical farming, the on-the-go shifting without foot clutching, from the power shift high clutch 31 to the torque amplifier low clutch 29, is more important. Thus, if a tractor proceeding along encounters a higher temporary or sustained load or resistance noticeable to the driver from slow down of the engine, he can if proceeding along with the high clutch 31 engaged immediately obtain torque amplification without foot clutching by power shifting to the torque amplifier low clutch 29; when the speed of the tractor builds back up as the high resistance area is passed by the tractor, the operator will immediately power shift back to the high clutch 31 and restore the higher speed operation.

It is also important during these on-the-go, so-called driver's clutchless shifts to maintain engagement pressure in both clutches 29 and 31 during the transition to ensure that the engine stays loaded and does not temporarily race. It is likewise important to know that the solenoids 114 and 116 actuate the solenoid valves under proper electromagnetic strength for positive operation.

For these reasons then, the current to the solenoids 114 and 116 is closely monitored, and the pressure switches 118 and 120 are likewise closely monitored while both solenoids are energized. In that way automatic control can be effected to prevent one of the clutches 29 or 31 from disengaging prior to the engagement of the oncoming one of those clutches; the off going clutch can then be ensured of disengagement after a predetermined interval of time of clutch overlap, and sluggish electromagnetic actuation of either valve 74 or 90 can be detected and avoided so as to prevent any clutch harm from occurring.

On the other hand, wear and other harm are prevented from occurring in the manual master clutch through automatic intervention of the fluid drive lockup clutch as will now be explained in connection with the following figure.

LOCKUP CLUTCH DRIVER—FIG. 4

Although an alternative electronic control circuit embodiment 50b can be employed therefor incorporating a more sophisticated microprocessor module 122, not shown, a speed responsive logic circuit 50a can be used adequately and to advantage to drive the solenoid 44 as illustrated in this figure.

So in FIG. 4, in identical manner to the described operation our co-assigned application Ser. No. 240,040 aforesaid, the immediate output from logic circuit 50a will be from a NAND gate, not shown, to the negative-indicated, inverting input 124 of a comparator 126. The disclosure of the just mentioned co-assigned application of ours is incorporated in entirety herein by reference, including its description of speed comparator hysteresis due to the NAND gate. Specifically, the output of the NAND gate is initially at a digital logic, low state (henceforth, voltage "lo") when the engine is at an idle and goes to a digital logic, high state (henceforth, "hi") when the higher transition speed is exceeded. Once the NAND gate output goes hi, it tends to be maintained hi. Then when the speed of the engine drops below the lower transition speed, the output of the NAND gate goes lo again, repeating its initial state.

A reference voltage having an amplitude between the hi and lo NAND gate output is applied to the positive-indicated, non-inverting input 128 of the comparator 126. Through its inverting input lead 124, the comparator 126 serves to invert the signal from the output of the NAND gate and to apply it (via a coupling resistor 130) to an amplifying circuit comprising a pair of PNP 132 and NPN 134 transistors and a resistor 136.

A resistor 142 serves as load resistor for the comparator 126 and a capacitor 143 across input leads 124 and 128 serves to prevent oscillation.

The emitter of the transistor 134 is connected to the solenoid valve 44 and serves to open the solenoid valve 44 in order to engage the lockup clutch 38, not shown, whenever the speed of the engine exceeds the upper transition speed, and to maintain the clutch 38 engaged until the speed of the engine drops below the lower transition speed.

A normally open upshift hand switch 149 is connected to bypass the PNP transistor 132 so that, in switch closed condition at 149, the NPN transistor 134 under the forward bias conducts, operating the solenoid valve 44 in FIG. 4 to engage the lockup clutch 38, FIG. 3. It will be recalled that the fluid drive 18 provides two speed ratio modes of driving the speed transmission input shaft 27, and the torque amplifier (TA) 29 and upshift or high speed 31 power shift clutch packs provide for two speed ratio modes of driving the selective gear trains of the speed transmission 20.

The upshift hand switch 149, FIG. 4, is preferably mounted in the operator's compartment adjacent the speed shifter handle 37, which latter is effective to upshift from TA to high speed by power shifting. So to effect a manually clutchless shift, the operator proceeding at a lower speed can operate the hand switch 149 alone to power upshift to one high speed, can operate the shift selector handle 37 alone to power upshift to another high speed, or can operate both for a double overdrive or double upshift to a combined higher speed without pedal clutching. That is, operator's clutchless shifts afford on-the-go changes to four different speeds all made at the input end of the speed transmission.

An emitter-connected diode 144 serves as a transient protection diode to protect the transistors 132 and 134 from transients generated by the solenoid valve 44 when the valve is de-energized. A master clutch switch 145 serves to prevent the lockup clutch 38, not shown, from being engaged whenever the master clutch, not shown, is disengaged.

Also, the range shift connection 63 operates the switch contact 61 to prevent the lockup clutch 38, not shown, from being engaged when the range transmission is in the reverse position corresponding to the switch position 61r.

A clutch pedal responsive, activator circuit 138 has switch contacts 140 to activate the electronic control circuit, not shown, and the switch 140 together with the previously described switch 145 are controlled in common by a master clutch pedal 146.

With both switches 145 and 61 closed (clutch pedal released, range transmission shifted out of reverse), the overall solenoid driver circuit operation starting with the engine reaching its higher transition speed is as follows. A NAND gate hi output impressed on inverting input lead 124 causes the comparator 126 to impose a lo on the base of PNP transistor 132 thus causing the latter to conduct. The resulting hi on the base of the NPN transistor 134 forward biases the latter so that it conducts, energizes solenoid 44, and opens the lockup clutch valve and engages the lockup clutch, not shown.

On the other hand, the lockup clutch 38, not shown, is released by solenoid valve closure caused, first, when the NAND gate output goes lo corresponding to the lower engine transition speed and creating in the driver circuit an opposite series of hi's and lo's, to the foregoing or, second, when the clutch pedal is depressed and opens up the master clutch switch 145 or, third, when the shifter connection 63 opens the switch contacts 61 by placing the range transmission in reverse.

Figure 5:
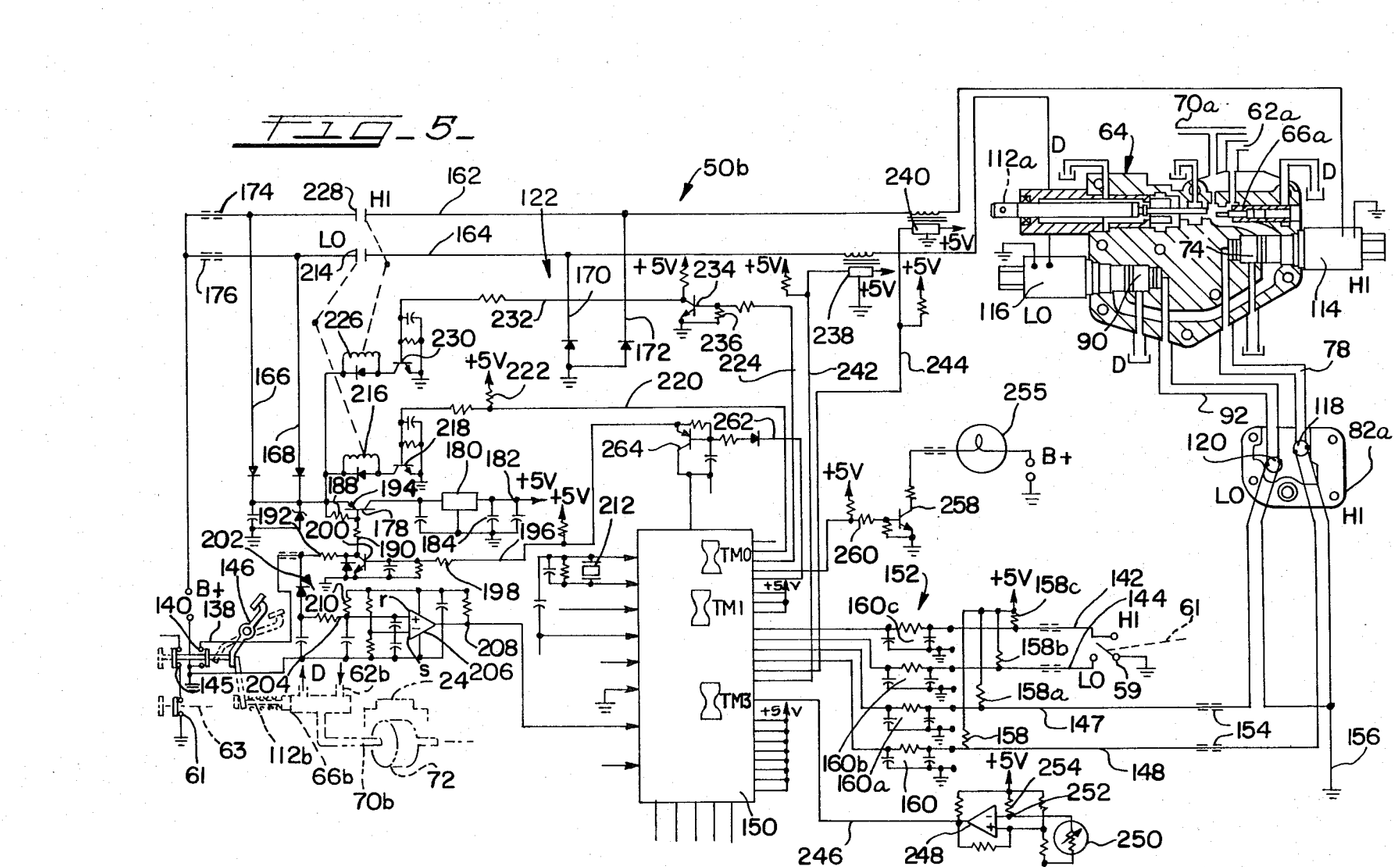
FIG. 5 is the full electronic schematic diagram.

Because one form of the operating electronic control circuit 50 appearing in FIG. 1 has just been described corresponding to embodiment 50a, FIG. 4, it will be unnecessary at this point to describe how that operation can equally well be accomplished by appropriate modification of the already referred to control circuit embodiment 50b which can be employed to advantage, in known way, incorporating a more sophisticated microprocessor module 122. For that reason, only the other functions of that microprocessor module 122 will be illustrated and described in the following figure disclosing the electronic control circuit embodiment 50b.

MICROPROCESSOR MODULE—FIG. 5

The emphasis to follow is mostly on pressure switch and solenoid and clutch pedal monitoring all as afforded by the module 122 employed in the electrical control circuit embodiment 50b as illustrated in FIG. 5.

The following described eight (8) means all operating in the same way for the same purpose thereto are identical to the same eight means described and claimed in coassigned U.S. application Ser. No. 381,261 filed May 24, 1982, the disclosure of which is incorporated in entirety herein by reference.

First, means is provided for pressure switch monitoring comprising components completely illustratively interrelated as shown by standard symbols in FIG. 5, and identified therein by respective reference numerals 146, 148, 150 (chip), 152, 154, 156, 158abc, and 160abc. The chip 150 and normally closed switches 118, 120 provide a comparator hysteresis effect, because rising (clutch engaging) pressure opens each switch at 58 psi and falling (disengagement) pressure re-closes each switch at 43 psi. The difference between the 58 and 43 psi end set points accounts for proper slippage during temporary clutch overlap.

Second, means is provided to power the module and solenoid valves 74,90 comprising components illustrated in their interrelationship and depicted by standard symbols in FIG. 5, and designated therein by respective reference numerals 162, 164, 166, 168, 170, 172, 174, and 176.

Third, means is provided for pedal switch monitoring and providing a regulated +5 V supply, and the components illustrated generally therefor in FIG. 5 are identified by respective reference numerals 178, 180, 182, 184, 146, 188, 190, 192, 194, 196, 198, and 200. The pedal switch monitoring circuit for detail is identified by the reference numerals 138, 202, 204, 206, 208, and 210.

The chip 150 is supplied through one or more of the several regulated +5 V inputs indicated therefor and, fourth, means is provided for accurate frequency regulation of the chip comprising a clock crystal oscillator indicated at 212 which oscillates for example precisely at 3.58 mHz. So a chip timer TM0, among the several timers in chip 150, can stably and accurately time a one second or a three second interval as necessary; similarly another timer TM1 will accurately time a 400 millisecond interval and another timer TM3 will accurately time a one minute interval, all with good repeatability.

Fifth, means is provided for selected clutch operation and components illustrated for that purpose in FIG. 5 are designated by respective reference numerals 214, 216, 218 NPN, 220, 222, 224, 226, 228, 230 NPN, 232, 234 NPN, and 236.

Sixth, means is provided for electrical clutch monitoring and components illustrated for the purpose by standard symbols in FIG. 5 are indicated therein by respective reference numerals 238 (Hall), 240 (Hall), 242, and 244.

Seventh, means is provided to switch timer TM0 from one second cycles to three second cycles during cold start up conditions and components for the purpose illustrated in FIG. 5 are designated by reference numerals 246, 248, 250 (ambient negative coefficient thermistor bead), 252, and 254. Conventional electronic symbols are employed consistently.

And eighth, means of illumination is provided for a sentry light 255 to signal any failure mode to which the microprocessor chip 150 is sensitive and the components illustrated for the purpose in FIG. 5 are designated by the respective reference numerals 256, 258, and 260.

Alternatively, the speed comparator hysteresis can be satisfactorily provided through a tractor speed sensitive microprocessor chip described and claimed in coassigned U.S. application Ser. No. 397,706 filed July 13, 1982, the disclosure of which is incorporated in entirety herein by reference.

The hydraulic components 62, 66, and 70 illustrated and described in connection with FIG. 3 carry over in solid lines at respectively 62a, 66a, and 70a in FIG. 5 and for clarity, at another point, are repeated in FIG. 5 in broken lines at 62b, 62b, and 70b.

It will be appreciated in the composite transmission hereof that the master and fluid line drive lockup clutches are arranged in series sequence in the power path with the selected one of the high speed-torque amplifier (TA) clutches, which latter clutches of that clutch set being mechanically in parallel to one another. But to return to the high speed-TA, master, and fluid lockup clutches, they enter into full engagement in a series sequence, always in the same, short order and with no two or more of the series clutches in their enforced tight sequence fully engaging simultaneously.

The intervening master clutch modulating valve contributes in part to the lag of engagement of the master clutch so as to ensure that the fast acting, small volume cylinders controlling the high speed-TA power shift clutches will engage the selected one of the latter before the master clutch, with its characteristic high heat dissipating capacity, will engage. In comparative terms, the fluid coupling clutch 38 lags so that it is even slower in engaging, and the master clutch engages before the restriction 46 will allow the lockup clutch cylinder 40 to fill and engage the lockup clutch.

So we achieve the novel result afforded by relatively fast acting means to engage the selected power shift clutch first, second means of engaging the master clutch second, and slowed action means to engage the lockup clutch always last.

Or, viewed in the disengaging way, the range transmission through disengagement of the master clutch is free from the inertia of the speed transmission for reduced wear of the mechanical synchronizers of the range transmission during shifts therein between gear ratios. Also to be noted is that both or either of the power shift speed clutches disengages whenever the master clutch is disengaged by the pedal. The speed transmission, at both ends thereof, will therefore be simultaneously disconnected from engine and range transmission inertias for easier synchronizations during speed transmission shifts, with appreciably less delay by, and wear upon, the mechanical synchronizers therein.

Roading operations have a difference of significance with this second embodiment during the transition, let us say, of progressing onto pavement from a gravel road that was suited to a low range condition with the speed transmission in its TA power clutch setting. Power train reengagement, required after placing the range transmission into a more appropriate higher setting, allows the master clutch to start to operate with, for example, as high as a 25% slip being reached for the moment in the slip drive. The first power shift, with but generally decidedly ahead of, power shifting the high clutch, occurs with lockout of the fluid slip drive to a 1:1 upshift speed ratio by engagement of the lockup clutch.

The second power upshift obviously transpires with the operator changing the shift lever of the power shift clutches to its high speed clutch setting.

In a critical subcombination involved in the foregoing, significant factors have played a role in the important design considerations. I. What the large hydraulic volume and long clutch travel of the mid-mounted manual clutch mean, of significance to the designer of the clutches, and in addition to the lag caused thereto by the modulating valve already referred to, is that the manual clutch must have a head start in initiation of its engagement over the HI and LO (TA) ratio power shift clutches. So the longer clutch fill time and longer full engagement pressure rise time are, by known programming technique, automatically compensated for by the downpressed clutch pedal and pedal switch. The pedal and switch do not allow the module to initiate power shift clutch engagement until after initiation of the manual clutch engagement which, for full engagement, is time-delayed by its own relative slowness in ultimately building up to full engagement pressure.

II. The large clutch face surface area and high energy absorbing capacity which are evident by mere inspection of the manual clutch pack disks (22, FIG. 3) mean, to the designer, that the software, by known technique, must be programmed to fully engage forthwith the quick response, power shift clutch selected, all to be accomplished within delay time of engagement of the manually operated clutch. So the selected, small power shift clutch is always fully engaged and stabilized before the large capacity manual clutch takes over the burden of coupling together the speed and the load-connected range transmissions for their synchronized power transmitting operation in tandem.

III. Monitoring each supposedly active pressure switch for any undesired zero-hydraulic-pressure interval is evident in its meaning and purpose to the designer, because such a full failure mode (valve temporarily sticking, for one example) for only an interval with a small power shift clutch could put it out of sequence when it did finally engage, and tax it beyond what it was designed for. So in this evident situation the software program perforce shuts down the clutch automatically to insure against damage from a later attempted reengagement.

IV. Monitoring each supposedly active pressure switch at end setpoints (58 and 43 psi) of a critical threshold pressure established by the designer for the selected power shift clutch is not so evident in its meaning and purpose, however. Such clutch can just as seriously be damaged if the clutch cylinder pressure hunts around (erratic pump, oscillating valve) in and from the threshold range with a hesitant or tentative action causing off-and-on slip over an interval of time. So timed threshold pressure monitoring is equally important as a programmed consideration in automatically shutting down a selected power shift clutch.

V. Monitoring each supposedly active Hall effect switch (238 and 240, FIG. 5) for any undesired zero current interval is evident in its meaning and purpose to the clutch solenoid switch designer. Such a full power lapse failure (intermittently open winding, for one example) for only an interval with a small power shift clutch could put it out of sequence, and eventually tax it beyond its design capability. So the need for automatic programming of a shut-down for such a clutch is evident and achieved here.

VI. Monitoring each supposedly active Hall effect switch 238, 240 at a critical current threshold (1.25 amperes) established by the designer for the selected power shift clutch is not so evident in its meaning and purpose, however. Again, the solenoid supply current if it hunts around the threshold value can cause an undesirable hesitant or tentative valve and clutch action, and an off-and-on slipping clutch over a time interval. So timed threshold current monitoring for the clutch valve solenoids and automatic clutch shut down are equally important to be programmed into the chip micro P 150 here.

VIII. What the described emergency programming means, in regard to an oncoming selected clutch which malfunctions as monitored and which is forthwith automatically shut down, and in regard to the offgoing clutch which is still effective as monitored and which is automatically kept engaged although no longer selected by the operator, is that the tractor keeps pulling to bring it in from the fields even though the sentry light continually shows failure mode due to the unused, malfunctioning clutch. In other words, continuing to operate the one good clutch in no way further jeopardizes the malfunctioning clutch.

Carried to the extreme, the emergency programming takes into account the ultimate failure of the module 122 which in most conceivable circumstances will result in a positive signal from all output pins of the chip 150. A positive signal in HI clutch conductor 224 will, because of its inverting NPN transistor 234, FIG. 5, included therein, result in disengagement of the HI clutch because of deenergization of the HI clutch solenoid 114, irrespective of which power shift clutch is the selected one.

So therefore irrespective of what the selection is, a concomitant positive signal in the LO clutch conductor 220 will result in energization of the LO clutch solenoid 116 so as to furnish a power shift, LO clutch drive available to retrieve the tractor under its own power from point of module failure.

Variations within the spirit and scope of the invention described are equally comprehended by the foregoing description.

What is claimed is:

1. Power shifted composite drive to transmit multiple speeds from an uninterruptedly loaded engine shaft of an engine comprising, in combination with an operator-moved operating element (146) for the drive:

a speed transmission (20) having an input shaft (27), an output shaft (104), plural intervening gear ratio trains selectively connected to the output shaft, first means of fluid slip-drive coupling (18) the engine shaft to said input shaft, a second means of coupling (29, 31) said input shaft to said selective gear ratio trains;

a shiftable step ratio range transmission (24) having at least three different gear ratios to provide at least three ranges of speed and powered by a shaft thereof to be driven by said speed transmission output shaft;

third means of coupling (22) connecting said output shaft to the shaft of the range transmission to be driven thereby;

said first coupling comprising a power-shift lockup clutch (38) for the fluid slip-drive causing it to transmit engine speed to said speed transmission input shaft for two appreciably different (at least 10%) speed ratio modes of driving same from the engine, said second coupling comprising selectable high speed-torque amplifier power shift clutches (29, 31) to transmit input shaft speed to the selected gear ratio train with clutch-overlap action for two appreciably different (17%) speed ratio modes of driving same from the input shaft, for providing four distinctive power shift output speeds (0%, 10%, 17%, 30%) by substantial upshifts afforded by the speed transmission in driving the range transmission all in a given range, and said third coupling comprising a master clutch;

means (94 small) including a member (140) operated by the operating element, and effective with fast action to engage the selected high speed clutch first;

second means (22 large) including a member (112) operated by the operating element, and effective with slowed action, by timed delay, to engage the master clutch second; and third means (38) including a member (145) operated by the operating element, and effective with further slowed action, by timed delay, to engage the lockup clutch last.

2. Power shifted composite drive to transmit multiple speeds from the engine shaft of an engine, comprising:

a speed transmission (20) having an input shaft, an output shaft, a plural intervening mechanically synchronized gear ratio trains selectively connected to the output shaft, first means (18) providing a fluid coupling of the engine shaft to said input shaft, and second means (29,31) coupling said input shaft to said mechanically synchronized, selective gear ratio trains;

a synchronized gear ratio range transmission (24) which is step shiftable to provide at least three ranges of speed and powered by a range transmission driving shaft (110) to be driven by said speed transmission output shaft;

third means (22) comprising a master clutch coupling said output shaft to the driving shaft of the range transmission to be driven thereby;

means (146, 112, 72, 138, 206, 150, 90, 74) to disengage the just said third coupling to free the range transmission from the inertia of the speed transmission for reduced wear of the synchronized range transmission during shifts between gear ratios, and to disengage the second coupling to free the speed transmission from the inertia of the engine for reduced wear of the mechanical synchronizers therein during changes of the gear ratio train selected;

said first coupling comprising a high-slip fluid drive and power shift lockup clutch (38) device to transmit engine speed to said speed transmission input shaft for two speed ratio modes of driving same from the engine, and said second coupling comprising selectable torque amplifier power shift clutches to transmit input shaft speed to the selected mechanically synchronized gear ratio train for two speed ratio modes of driving same from the input shaft, and including a power shift high speed clutch means for power shifting to a higher speed;

power shift operating means (149,59) to operate said master clutch for coupling the output and driving shafts, and to operate said power shift lockup clutch for power shifting to a higher speed, and to operate said power shift high speed clutch means for power shifting to a higher speed, all to complete a clutched together power path from engine through the range transmission; and activatable means included in said operating means which, as a tight sequence when activated, engages the high speed clutch means with fast action first, then with slowed action, by timed delay, engages the master clutch next, and then with further slowed action, with timed delay, engages the lockup clutch last to complete said clutched together power path.

3. The invention in accordance with claim 2, wherein the range transmission includes a reverse gear setting, characterized by:

said lock-up clutch controlling means including electrical hydraulic control means (61, 44, 40) responsive to a reverse gear setting of the range transmission to effectuate and maintain the lockup clutch in disengagement while the range transmission stays reversed.

4. Power shifted composite drive to transmit multiple speeds from the engine shaft of an engine, comprising:

a speed transmission (20) having an input shaft, an output shaft, and plural intervening mechanically synchronized gear ratio trains selectively connected to the output shaft, first means (18) providing a fluid coupling of the engine shaft to said input shaft, and second means (29, 31) in said speed transmission coupling its input shaft to said mechanically synchronized, selective gear ratio trains;

a synchronized gear ratio range transmission (24) which is step shiftable to provide at least three ranges of speed and powered by a range transmission driving shaft (110) to be driven by said speed transmission output shaft;

third means (22) comprising a master clutch coupling said output shaft to the driving shaft of the range transmission to be driven thereby;

means (146, 112, 72, 138, 206, 150, 90, 74) to disengage the master clutch of the just said third coupling to free the range transmission from the inertia of the speed transmission for reduced wear of the synchronized range transmission during shifts between gear ratios, and to disengage the second coupling to free the speed transmission from the inertia of the engine for reduced wear of the mechanical synchronizers therein during changes of the gear ratio train selected;

said first coupling comprising a high-slip fluid drive and power shift lockup clutch (38) device to transmit engine speed to said speed transmission input shaft for two speed ratio modes of driving same from the engine, and said second coupling comprising selectable torque amplifier power shift clutches to transmit input shaft speed to the selected mechanically synchronized gear ratio train for two speed ratio modes of driving same from the input shaft, and including a power shift high speed clutch means for power shifting to a higher speed;

power shift operating means (149, 59) to operate said master clutch for coupling the output and driving shafts, and to operate said power shift lockup clutch for power shifting to a higher speed, and to operate said power shift high speed clutch means for power shifting to a higher speed, all to complete a clutched together power path from engine through the range transmission;

activatable means included in said operating means which, in a tight sequence when activated, engages the high speed clutch means with fast action first, then with slowed action, by timed delay, engages the master clutch next, and then with further slowed action, by timed delay, engages the lockup clutch last to complete said clutched together power path;

electrical hydraulic means for controlling the engagement and disengagement of the lockup clutch including electrical hydraulic control means (145, 44, 40) responsive to disengagement of the master clutch to effectuate and maintain the lockup clutch in disengagement while the master clutch stays disengaged; and electrical hydraulic means for controlling the engagement and disengagement of the power shift clutches including electrical hydraulic control means (40, 138, 206, 150, 74, 90) responsive to disengagement of the master clutch to effectuate and maintain the power shift clutches in disengagement while the master clutch stays fully disengaged.

5. Power shifted composite drive to transmit a selection of multiple speeds from a driving engine comprising:

a tractor speed transmission with a fluid slip drive and lockup device (18) including a lockup clutch (38), and a power input end (13) ahead of said device, said device arranged to be coupled to the power input end of the transmission;

said transmission including therein a selective gearing power path which follows said device and which is coupled thereby to the power input end for two speed ratio modes of driving same from said transmission power input end;

said transmission arranged with a power path output end (110), and with a master clutch (22) in the power path in said power output end effectively in series with the selective gearing and with the fluid drive lockup device;

said master clutch having slight sustained slip vulnerability and the lockup clutch of said fluid drive lockup device having lesser of such vulnerability as compared to the master clutch;

activatable means which operates in a tight sequence when activated and which includes first means (28) of engaging the master clutch with action first, and a slowed action control (44, 46, 48) effective, with timed delay, to engage the lockup clutch second; and a separate lockup activating control responsive to speed (60) of the driving engine, and referenced to differing engine speed points (1,000 rpm; 1,400 rpm) affording hysteresis control responsively disengaging the lockup clutch at a point in speed and re-engaging it always at a predeterminedly higher point.

6. The invention in accordance with claim 5, characterized by:

a master operating element (146) for the master clutch; and an activating member (145) included in the slowed action lockup clutch control, which member is connected for movement with the master operating element and which affords response of the lockup clutch to operation (146) of the master clutch for disengagement and actuation of the master clutch for its re-engagement for, respectively, disengaging the lockup clutch and, with slowed action, re-engaging the lockup clutch.

7. The invention in accordance with claim 5 in further combination with a reversible range transmission box connected by the master clutch to the power output end of said transmission, said separate control for the lockup clutch responsive:

responding to the range box (24) being placed into a reverse setting (61r) and out (61s) of its reverse setting for respectively taking an operative position corresponding to disengagement of the lockup clutch and taking an operative position corresponding to re-engagement of the lockup clutch.

8. The invention in accordance with claim 5 in further combination with a tandem-connected reversible range transmission box, said separate control for the lockup clutch:

having operative positions to disengage the lockup clutch in response to a predetermined engine speed (1,000 rpm), in response to a reverse setting (61r) of the reversible speed box, and in response to operation (145) of the master clutch (22) for disengagement.

9. Power shifted composite drive to transmit a selection of multiple speeds from a driving engine comprising:

a multispeed transmission with a transmission power input end, and incorporating a power path output end arranged in gear train drive relation to the transmission to be driven thereby;

said transmission having HI-LO selectable high speed clutches arranged to be coupled to the transmission power input end, arranged with intervening gear ratio trains therefollowing in the transmission, and further arranged with a fluid slip drive and lockup device, including a lockup clutch, in said power input end for coupling it to the selected one of the high speed clutches for two speed ratio modes of driving same therefrom;

said transmission arranged with a master clutch in the power path in said power output end effectively in series with the intervening gear ratio trains, and with the fluid drive lockup clutch and with the high speed clutches;

said clutches possessed of differing vulnerability to slip damage, with the high speed clutches having sustained slip vulnerability, said master clutch having less vulnerability, and said lockup clutch being at least vulnerable; and means of engagement control which operates in a tight sequence when activated and which includes fast acting means (80, 94 small) effective to engage the selected high speed clutch first, second means (66, 72 large) effective with slowed action, by timed delay, to engage the master clutch second, and third means (44, 46, 48) effective with further slowed action, by timed delay, to engage the lockup clutch last.

10. The invention in accordance with claim 9, said engagement control means including a clutch pedal (146) releasable from a depressed, master clutch disengaging position;

said fast acting means (80, 94 small) and said third means (44, 46, 48) effective automatically in response to release of said clutch pedal.

11. The invention of claim 9, said lockup clutch (38) having as a separate control therefor a clutch operator responsive to an operating characteristic (62) of said engine to automatically independently disengage and re-engage the lockup clutch.

12. The invention in accordance with claim 11, the separate control for the lockup clutch responsive to operation (145) of the master clutch for disengagement and actuation of the master clutch for its re-engagement for, respectively, disengaging (44, D) the lockup clutch and, with said timed delay action, re-engaging (42, 44, 46, 48) the lockup clutch.

13. The invention in accordance with claim 11, the separate control for the lockup clutch responsive to speed (62) of the engine by disengaging and re-engaging the lockup clutch at points.

14. The invention in accordance with claim 13, characterized by:

the separate control referenced to differing engine speed points (1,000 rpm; 1,400 rpm), and affording hysteresis control, responsively disengaging the lockup clutch at a point in speed and re-engaging it always at a predeterminedly higher point point in speed.

15. The invention in accordance with claim 11 in further combination with a reversible range transmission box connected by the master clutch in the power output end of said transmission, said separate control for the lockup clutch     responsive to the range box setting wherein it is placed into a reverse setting (61r) and shifted out (61s) of its reverse setting for, respectively, taking an operative position corresponding to disengagement of the lockup clutch and taking an operative position corresponding to re-engagement of the lockup clutch.

16. The invention in accordance with claim 11 in further combination with a tandem-connected reversible range transmission box, said separate control for the lockup clutch having operative positions     to disengage the lockup clutch in response to a predetermined engine speed, (1,000 rpm), in response to a reverse setting (61r) taken by the reversible range box, and in response to operation (145) of the master clutch (22) for disengagement.

17. Mode of operating a multispeed transmission with a power input end, and arranged with a power path output end in gear train drive relation to the transmission to be driven thereby, said transmission having HI-LO selectable high speed clutches arranged to be coupled to the transmission power input end, arranged with intervening gear ratio trains therefollowing in the transmission, and further arranged with a fluid slip drive and lockup device, including a lockup clutch, in said power input end for coupling it to the selected one of the high speed clutches for two speed ratio modes of driving same therefrom, said transmission further arranged with a master clutch in the power path in said power output end effectively in series with the intervening gear ratio trains, and with the fluid drive lockup clutch and with the high speed clutches, said clutches possessed of differing vulnerability to slip damage, with the high speed clutches having sustained slip vulnerability, said master clutch having less vulnerability, and said lockup clutch being least vulnerable, said gear ratio trains including mechanical transmission synchronizers for smooth shifting and constituting together with all clutches aforesaid a shock-free composite drive,     comprising the steps of:

declutching the just said composite drive by disengaging all said clutches, and     making a mechanically synchronized shift in said gear ratio trains from one ratio to a different ratio; and     comprising further, as a tight sequence, the steps of:

with fast action engaging the selected high speed clutch first,     engaging with slowed action, by timed delay, the master clutch next, and     with further slowed action, by timed delay, engaging the fluid drive lockup clutch last to complete a clutched-together composite drive.

18. The invention in accordance with claim 17, characterized by the interposed steps of:

manually commencing re-engagement of the master clutch; and     automatically instituting the sequence of both the fast action to re-engage the selected high speed clutch and the aforesaid further slowed action to re-engage the lock-up clutch in response to commencing re-engagement of the master clutch as described.

\* \* \* \* \*